United States Patent
Weh et al.

(10) Patent No.: US 11,708,825 B2
(45) Date of Patent: Jul. 25, 2023

(54) HYDRAULIC BLOCK FOR A HYDRAULIC UNIT OF A HYDRAULIC VEHICLE POWER BRAKING SYSTEM

(71) Applicant: Robert Bosch GmbH, Stuttgart (DE)

(72) Inventors: Andreas Weh, Sulzberg (DE); Martin Hagspiel, Rettenberg (DE); Matthias Mayr, Rettenberg (DE); Stefan Kaserer, Ofterschwang (DE)

(73) Assignee: ROBERT BOSCH GMBH, Stuttgart (DE)

( * ) Notice: Subject to any disclaimer, the term of this patent is extended or adjusted under 35 U.S.C. 154(b) by 228 days.

(21) Appl. No.: 17/201,971

(22) Filed: Mar. 15, 2021

(65) Prior Publication Data

US 2021/0388829 A1   Dec. 16, 2021

(30) Foreign Application Priority Data

Jun. 15, 2020   (DE) .......................... 102020207358.9

(51) Int. Cl.
| | |
|---|---|
| *F04B 39/12* | (2006.01) |
| *B60T 17/00* | (2006.01) |
| *F15B 15/14* | (2006.01) |
| *B60T 13/74* | (2006.01) |

(52) U.S. Cl.
CPC .......... *F04B 39/122* (2013.01); *B60T 13/745* (2013.01); *B60T 17/00* (2013.01); *F15B 15/1414* (2013.01); *F15B 2015/1495* (2013.01)

(58) Field of Classification Search
CPC ...... B60T 13/745; B60T 17/00; F04B 39/122; F15B 15/1414; F15B 2015/1495
See application file for complete search history.

(56) References Cited

U.S. PATENT DOCUMENTS

| | | | | |
|---|---|---|---|---|
| 5,286,099 | A | * | 2/1994 | Fujita .................... B60T 8/4072 303/193 |
| 5,291,207 | A | * | 3/1994 | Kikuchi .................... B60T 7/22 455/85 |
| 2015/0377261 | A1 | * | 12/2015 | Weh .......................... F04B 9/02 92/33 |

FOREIGN PATENT DOCUMENTS

| | | | |
|---|---|---|---|
| DE | 102017214593 A1 | | 2/2019 |
| DE | 102018251768 A1 | * | 7/2019 ............ B60T 13/662 |

OTHER PUBLICATIONS

DE 102018251768 A1 machine translation (Year: 2019).*

* cited by examiner

*Primary Examiner* — Kenneth Bomberg
*Assistant Examiner* — Matthew Wiblin
(74) *Attorney, Agent, or Firm* — Norton Rose Fulbright US LLP; Gerard Messina (57) ABSTRACT

For rotary protection of an external force piston of a power brake pressure generator of a hydraulic vehicle power braking system, axially parallel rotary protection grooves are provided at a circumference of an external force cylinder bore in a hydraulic block of a hydraulic unit of the vehicle power braking system, and tabs of the external force piston protrude into the rotary protection grooves.

8 Claims, 5 Drawing Sheets

HYDRAULIC BLOCK FOR A HYDRAULIC UNIT OF A HYDRAULIC VEHICLE POWER BRAKING SYSTEM

CROSS REFERENCE

The present application claims the benefit under 35 U.S.C. § 119 of German Patent Application No. DE 102020207358.9 filed on Jun. 15, 2020, which is expressly incorporated herein by reference in its entirety.

FIELD

The present invention relates to a hydraulic block for a hydraulic unit of a hydraulic vehicle power braking system, and a method for manufacturing the hydraulic block. Hydraulic blocks of this type are used for mechanically fastening and hydraulically connecting hydraulic components to a brake pressure generation via external force, and for regulating or controlling the brake pressure and/or a slip control. The hydraulic block fitted with the hydraulic components forms the hydraulic unit.

BACKGROUND INFORMATION

German Patent Application No. DE 10 2017 214 593 A1 describes a hydraulic unit for a hydraulic vehicle power braking system, including a cuboidal hydraulic block with an external force cylinder bore in which an external force piston for generating a hydraulic brake pressure via external force is accommodated in an axially displaceable manner. An electric motor via which the piston is displaceable in the external force cylinder bore of the hydraulic block via a helical gear is fastened to the hydraulic block at an opening of the external force cylinder bore. The helical gear is situated between the electric motor and the external force piston. A brake pressure may be generated and/or brake fluid may be conveyed by displacing the external force piston in the external force cylinder bore. The brake pressure, and/or wheel brake pressures for slip control, in hydraulic wheel brakes that are connected to the hydraulic block via brake lines may be regulated using solenoid valves situated at or in the hydraulic block.

For rotary protection of the external force piston, the conventional hydraulic block includes three cylinder pins that are distributed over a circumference axially parallel to the external force cylinder bore, at an inner circumference of the external force cylinder bore, in such a way that they protrude inwardly with approximately one-half of their diameter. A ring that encloses the external force piston is mounted on the external force piston at an end facing the electric motor. The ring includes three inwardly projecting tabs that protrude into complementary recesses of the external force piston and thus rotatably fixedly hold the ring on the external force piston, and includes three semicircular recesses at its outer circumference into which the cylinder pins are inserted, so that the external force piston is axially displaceably and rotatably fixedly held via the cylinder pins and the ring.

SUMMARY

A hydraulic block according to the present invention is provided for a hydraulic unit of a hydraulic vehicle power braking system that includes in particular a slip control. A key part of hydraulic vehicle power braking systems that include a slip control is a hydraulic unit with a hydraulic block to which hydraulic wheel brakes of the vehicle braking system are connected via brake lines. Slip regulation systems are in particular an antilock braking system (ABS), anti-slip regulation (ASR), and/or vehicle dynamics control (VDC) system/electronic stability program (ESP). The latter are commonly referred to as "anti-skid controls." Slip regulations are known, and are not explained here in greater detail. The hydraulic unit is used to generate brake pressure using external force, and to regulate brake pressure.

The hydraulic block is used to mechanically fasten and hydraulically connect hydraulic components of the vehicle braking system or its slip control. Such hydraulic components include, among others, solenoid valves, check valves, hydraulic accumulators, damper chambers, pressure sensors, and a power brake pressure generator, the power brake pressure generator including a piston cylinder unit that is or becomes accommodated in an external force cylinder bore of the hydraulic block. An external force piston of the piston cylinder unit of the power brake pressure generator is often also referred to as a plunger piston, and the external force cylinder bore, as a plunger receptacle, plunger bore, plunger cylinder, or the like. To generate pressure using external force, the external force piston of the power brake pressure generator is electromechanically displaced in the cylinder or in the external force cylinder bore via a helical gear with the aid of the electric motor, which is externally mounted at the hydraulic block, it being possible for a mechanical reduction gear, in particular a planetary gear, to be situated between the electric motor and the helical gear. The external force cylinder bore in the hydraulic block may form the cylinder of the power brake pressure generator, or a cylinder, a cylinder bushing, or the like may be situated at or in the external force cylinder bore.

The external force cylinder bore may also be understood as a receptacle for the piston or the piston cylinder unit of the power brake pressure generator.

The hydraulic components are fastened in receptacles in the hydraulic block, which are generally designed as cylindrical through holes or blind holes, with diameter gradations in part. "Connected" means that the receptacles or the hydraulic components fastened therein are connected by lines in the hydraulic block corresponding to a hydraulic circuit diagram of the vehicle braking system or its slip control. The lines are typically drilled into the hydraulic block.

The hydraulic block fitted with the hydraulic components of the vehicle braking system or its slip control forms a hydraulic unit; "fitted" means that the hydraulic components are fastened in the receptacles of the hydraulic block provided for same in each case.

In accordance with an example embodiment of the present invention, the hydraulic block is in particular cuboidal and preferably drilled in a Cartesian configuration, and in particular is made of metal. "Drilled in a Cartesian configuration" means that the receptacles for the hydraulic components and the lines connecting them are mounted in the hydraulic block in parallel, and perpendicularly to one another and to surfaces and edges of the hydraulic block. Individual oblique receptacles and/or lines are possible.

The hydraulic block according to an example embodiment of the present invention includes a rotary protection groove for the external force piston, situated at a circumference of the external force cylinder bore. The rotary protection groove extends in a longitudinal direction of the external force cylinder bore, i.e., axially parallel or possibly at an angle to an axial plane of the external force cylinder bore, for example in an undulated or helical manner. The rotary protection groove is open toward the external force cylinder bore, so that an rotary protection element of the external force piston, which rotatably fixedly and axially displaceably supports the external force piston in the rotary protection groove, may engage with the rotary protection groove. The rotary protection element of the external force piston may be, for example, a tab that projects outwardly from the external force piston and protrudes into the rotary protection groove.

The hydraulic block according to an example embodiment of the present invention may include multiple rotary protection grooves that are uniformly or nonuniformly distributed over a circumference of the external force cylinder bore.

By use of the rotary protection groove(s), the present invention achieves the rotary protection of the external force piston in a simple manner and without additional parts.

Refinements and advantageous embodiments of the present invention are disclosed herein.

One preferred embodiment of the present invention provides a centering groove that concentrically encloses an opening of the external force cylinder bore, the inner face and/or outer face of the centering groove forming a centering surface for a pivot bearing of a helical gear for displacing an external force piston in the external force cylinder bore. One refinement provides a pivot bearing support that is held at the inner face of the centering groove with a press fit and thus centered with respect to the external force cylinder bore.

A circumferential surface of the external force cylinder bore that axially displaceably guides the external force piston, and the centering groove or in any case the groove face that forms the centering surface, are preferably produced or in any case finish-machined at the same time using a tool, thus ensuring concentricity of the centering surface with respect to the circumferential surface of the external force cylinder bore.

All features disclosed in the present description and the figures may be implemented alone or basically in any combination for specific embodiments of the present invention. Embodiments of the present invention that do not include all, but, rather, only one or multiple, features of a specific embodiment of the present invention are possible.

BRIEF DESCRIPTION OF THE DRAWINGS

The present invention is explained in greater detail below based on one specific example embodiment illustrated in the figures.

DETAILED DESCRIPTION OF EXAMPLE EMBODIMENTS

Figure 1:
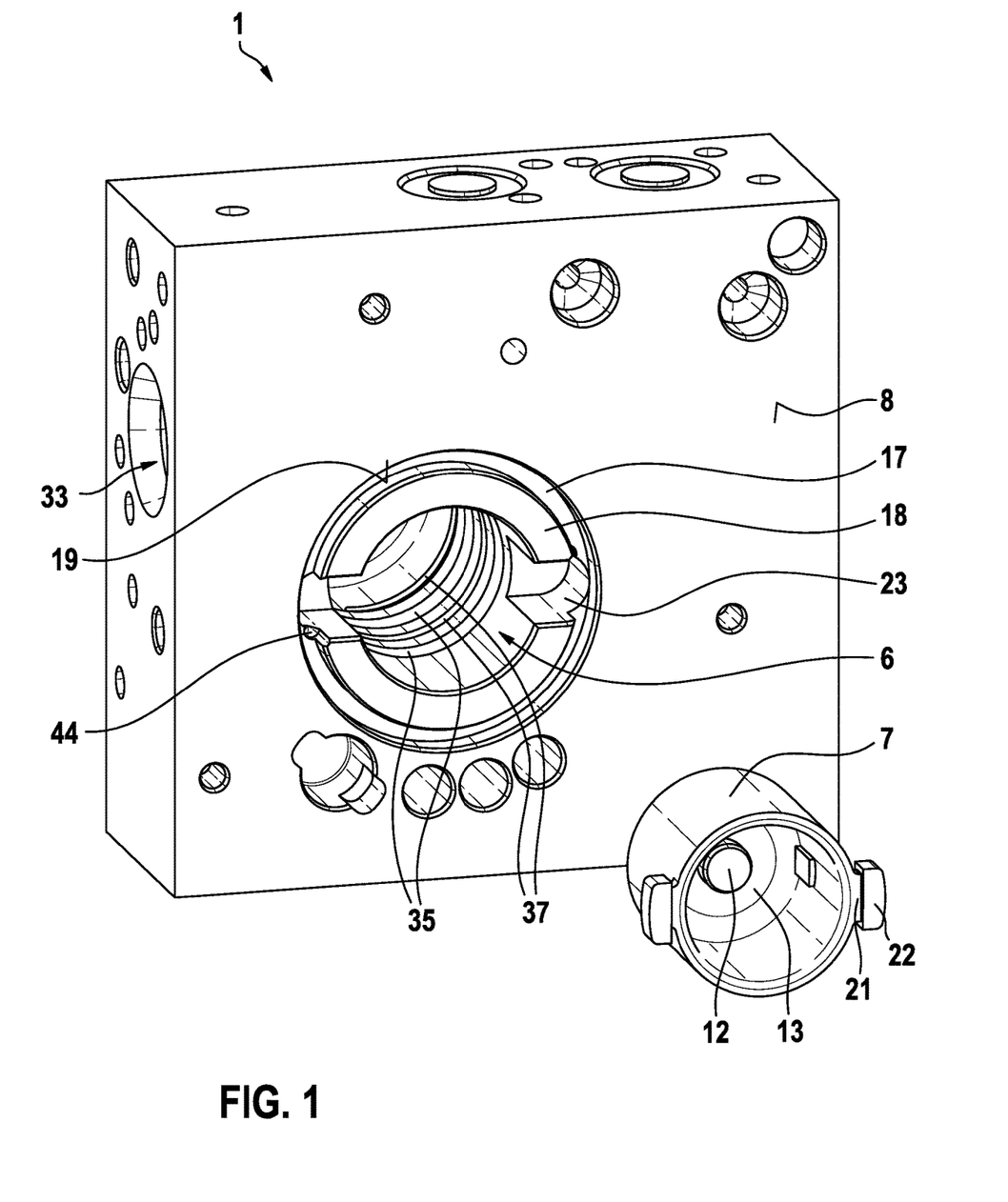
FIG. 1 shows a hydraulic block according to an example embodiment of the present invention in a perspective illustration.
Figure 2:
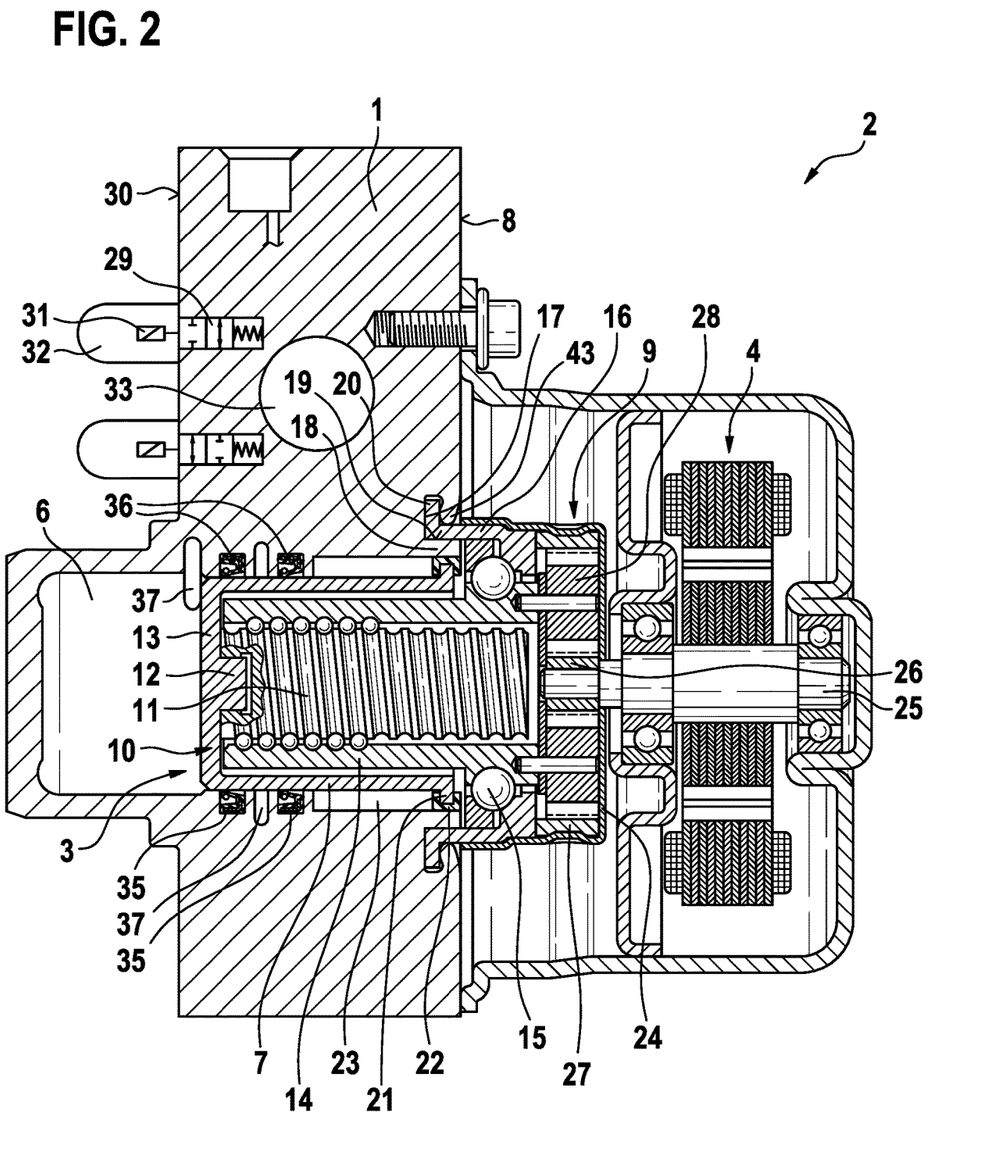
FIG. 2 shows a section of a hydraulic unit including the hydraulic block from FIG. 1 in an axial plane of an external force cylinder bore.
Figure 3:
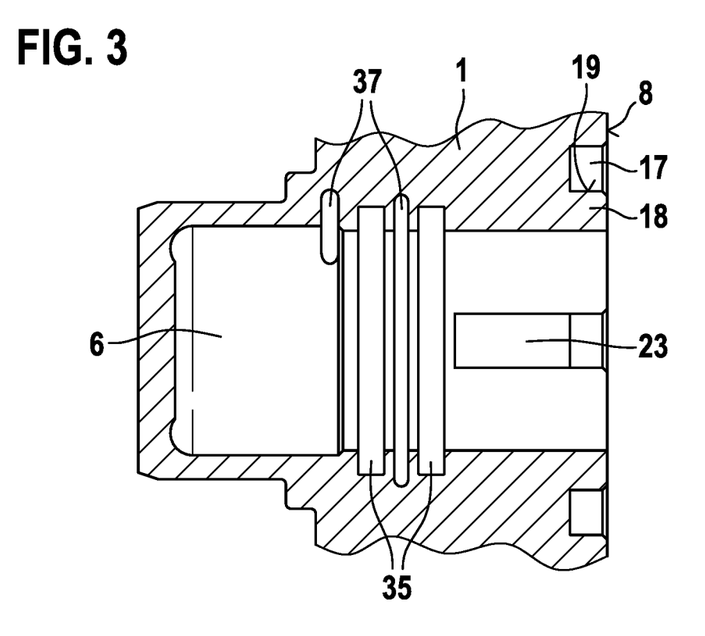
FIG. 3 shows an axial section of the hydraulic block from FIG. 1 in an axial plane of the external force cylinder bore that is rotated by 90° compared to FIG. 2.

Hydraulic block 1 according to an example embodiment of the present invention, illustrated in FIG. 1, is provided for a hydraulic unit 2 of a hydraulic vehicle power braking system that includes a slip control system. FIG. 2 shows a section of hydraulic unit 2 in an axial plane of an external force cylinder bore 6. Slip regulation systems are in particular an antilock braking system (ABS), anti-slip regulation (ASR), and/or vehicle dynamics control (VDC) system/electronic stability program (ESP). Hydraulic vehicle power braking systems with slip control and its hydraulic circuit diagrams are known and are not explained here.

In the exemplary embodiment, hydraulic block 1 is a narrow, cuboidal metal block whose oppositely situated large sides are virtually square. "Narrow" means that a distance between the two large sides is not greater than one-half of a length or width of the large sides. In the exemplary embodiment, the distance between the two large sides is approximately one-third to one-fourth of the length or width of the large sides. Other side ratios are possible. The described shape of hydraulic block 1 is not mandatory for the present invention.

Hydraulic block 1 is used to mechanically fasten and hydraulically connect hydraulic components of a brake pressure generation via external force, and to regulate brake pressure during a power brake application and/or slip control operation. Such hydraulic components are in particular solenoid valves, check valves, hydraulic accumulators, hydropumps, and a power brake pressure generator 3. The hydraulic components are fastened in receptacles in hydraulic block 1. The receptacles are cylindrical depressions, blind holes, and/or also through holes that may include diameter gradations and into which the hydraulic components are or become introduced and fastened pressure-tight by circumferential caulking, for example. The hydraulic components may be countersunk in the receptacles or may protrude from hydraulic block 1. Hydraulic block 1 fitted with the hydraulic components forms hydraulic unit 2 for generating the power brake pressure and regulating the brake pressure of the vehicle power braking system.

"Hydraulic connection" means that the receptacles for the hydraulic components are connected to one another by lines that lead through hydraulic block 1 corresponding to a hydraulic circuit diagram of the vehicle power braking system or its slip control system. The receptacles and lines form a so-called "doweling" of hydraulic block 1, it also being possible in principle to provide the receptacles and lines other than by drilling.

Hydraulic block 1 according to the present invention includes an external force cylinder bore 6 that passes through hydraulic block 1, perpendicularly with respect to the two opposite large sides of hydraulic block 1. External force cylinder bore 6 may be produced by drilling or in some way other than drilling. External force cylinder bore 6 forms a cylinder of a piston cylinder unit of power brake pressure generator 3, and is used to displaceably accommodate an external force piston 7 of power brake pressure generator 3, also often referred to as a plunger piston. External force piston 7 may be axially displaceably guided directly in external force cylinder bore 6, or indirectly in a cylinder bushing or a cylinder that is situated in external force cylinder bore 6.

Electric motor 4 for the drive, i.e., the displacement of external force piston 7 in external force cylinder bore 6, is externally mounted, coaxially with respect to external force cylinder bore 6, at one of the two large sides of hydraulic block 1, denoted here as motor side 8 of hydraulic block 1. Electric motor 4 displaces external force piston 7 via a planetary gear as a reduction gear 9, and a helical gear 10 which in the exemplary embodiment is designed as a ball screw drive. Electric motor 4, reduction gear 9, helical gear 10, external force piston 7, and external force cylinder bore 6 form power brake pressure generator 3 for generating a hydraulic brake pressure for a power brake application.

External force piston 7 is a cylindrical tube-shaped hollow piston with a closed end that faces a closed end of external force cylinder bore 6. Helical gear 10 is situated coaxially in external force piston 7 designed as a hollow piston, a spindle 11 being rigidly connected to a piston crown 13 at the closed end of external force piston 7 with the aid of a mortise and tenon joint 12. A tubular spindle nut 14 extends into an annular space between spindle 11 and external force piston 7 designed as a hollow piston, and protrudes from its open end and out of an opening of external force cylinder bore 6 on motor side 8 of hydraulic block 1. Outside external force piston 7, spindle nut 14 is rotatably supported on hydraulic block 1 via a ball bearing as a pivot bearing 15.

Pivot bearing 15 is fastened to hydraulic block 1 via an axially short, cylindrical tube-shaped bearing support 16. Bearing support 16 protrudes into a circular centering groove 17, which is mounted in motor side 8 of hydraulic block 1 and concentrically encloses external force cylinder bore 6 at its opening. In the exemplary embodiment, centering groove 17 has a rectangular groove cross section. Centering groove 17 forms an axially small, cylindrical tube-shaped centering collar 18 whose outer circumferential surface forms a centering surface 19 for bearing support 16 and pivot bearing 15. The outer circumferential surface of centering collar 18 that forms centering surface 19 is at the same time an inner face of centering groove 17.

Bearing support 16 is pressed onto centering collar 18 until it strikes a groove base of centering groove 17, so that it is held at centering collar 18 by a press fit.

At the groove base, bearing support 16 includes an outwardly protruding radial flange 20 at which the bearing support is held at hydraulic block 1 by circumferential caulking 43, via which the material of hydraulic block 1 is plastically molded around radial flange 20.

Figure 4:
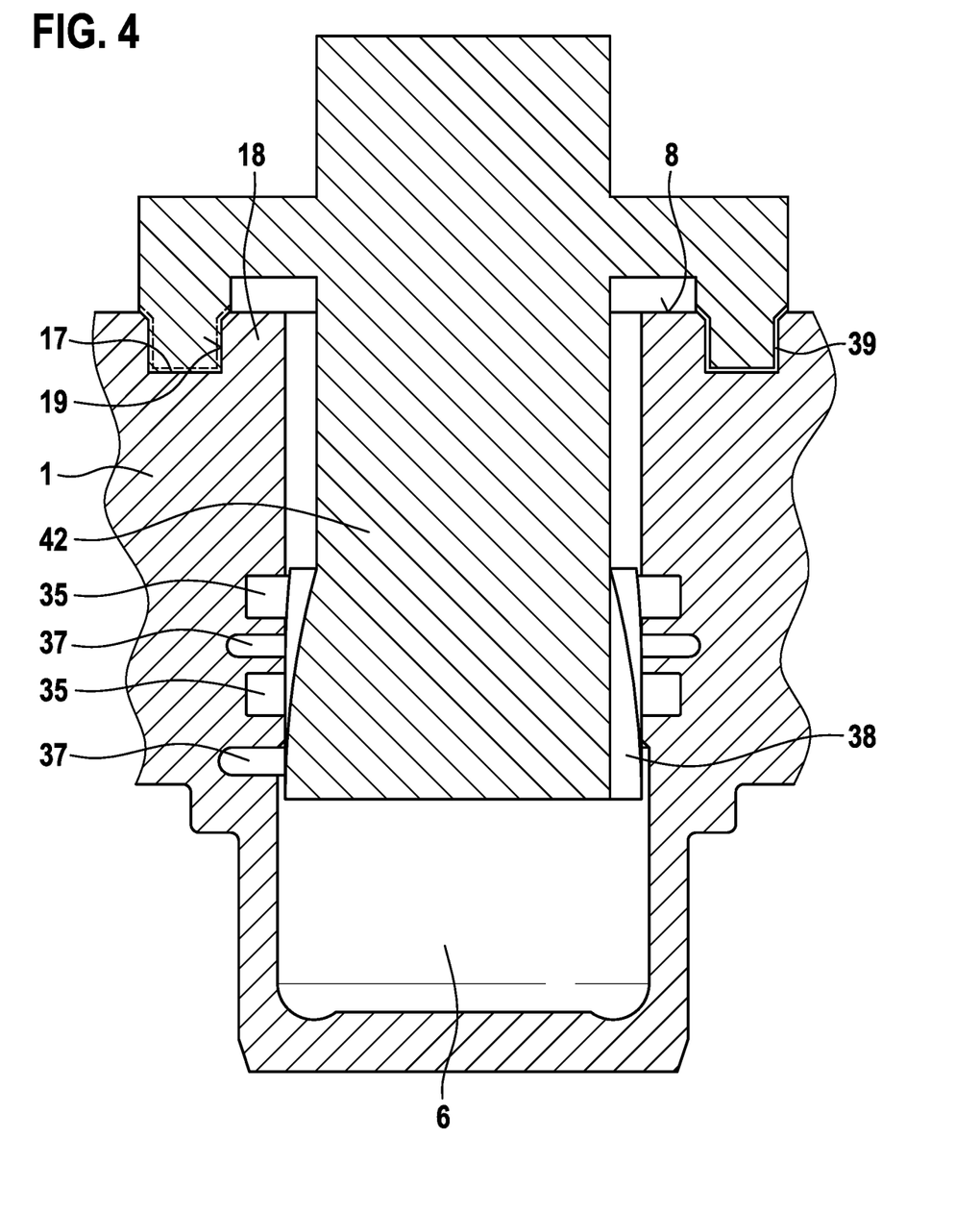
FIG. 4 shows finish-machining of the external force cylinder bore and production of a centering groove according to an example embodiment of the present invention that encloses the external force cylinder bore.

As schematically illustrated in a simplified manner in FIG. 4, centering groove 17 is produced using a milling tool 42, in the exemplary embodiment, a crown milling cutter 39, together with finish-machining of a circumferential surface of external force cylinder bore 6, to the extent that it axially displaceably guides external force piston 7. At the same time as the finish-machining of the circumferential surface of external force cylinder bore 6, centering groove 17 is thus produced using a tool, in the exemplary embodiment, milling tool 42, as the result of which centering groove 17 and centering surface 19 for pivot bearing 15 are precisely coaxial with the circumferential surface of external force cylinder bore 6.

As is shown in FIG. 1, external force piston 7 at its open end facing the opening of external force cylinder bore 6 includes two oppositely situated, radially outwardly protruding tabs 21 on which cap-like slide shoes 22 made of plastic are mounted. Tabs 21 with slide shoes 22 engage with rotary protection grooves 23 that are mounted axially parallel in hydraulic block 1 at oppositely situated circumferential points of external force cylinder bore 6. As a result, external force piston 7 is rotatably fixedly held and axially displaceable. Rotary protection grooves 23 are open toward external force cylinder bore 6. Outwardly protruding tabs 21 of external force piston 7 may also be generally understood as rotary protection elements. In FIG. 2, rotary protection grooves 23 are shown shifted by 90° about an axis of external force cylinder bore 6 in order to make them visible.

In the exemplary embodiment, rotary protection grooves 23 are open at the opening of external force cylinder bore 6, and end axially approximately in the center of external force cylinder bore 6. In the exemplary embodiment, the rotary protection grooves include mutually parallel groove faces and a semicylindrical groove base. The shape, arrangement, and number of rotary protection grooves 23 are not mandatory for the present invention.

The planetary gear that forms reduction gear 9 is accommodated in a gear cover 24 mounted on bearing support 16 of pivot bearing 25 of helical gear 10. In the exemplary embodiment, gear cover 24 likewise has the shape of an axially short cylindrical tube, including a base with a center hole for a motor shaft 25 of electric motor 4 to pass through. A sun wheel 26 of the planetary gear is rigidly mounted on motor shaft 25, and an annulus gear 27 of the planetary gear is rigidly mounted in gear cover 24. Planet wheels 28 of the planetary gear are rotatably situated on cylinder pins that protrude axially parallel from an end-face side of spindle nut 14 of helical gear 10. Spindle nut 14 forms a planet carrier of the planetary gear.

Electric motor 4 is fastened on motor side 8 of hydraulic block 1, coaxially with respect to the planetary gear that forms reduction gear 9, the helical gear, external force piston 7, and external force cylinder bore 6; in the exemplary embodiment, a motor housing of electric motor 4 is screwed to hydraulic block 1.

For generating a hydraulic brake pressure via external force, electric motor 4 rotatably drives spindle nut 14 of helical gear 10 via the planetary gear, as the result of which spindle 11 displaces external force piston 7 in external force cylinder bore 6.

For regulating the brake pressure, where regulation is also understood to mean control, solenoid valves 29 are situated at or in a valve side 30 of hydraulic block 1 opposite from motor side 8. Solenoid valves 29, shown as circuit symbols, are situated in blind holes mounted in valve side 30 of hydraulic block 1. The blind holes may include diameter gradations, and form receptacles for solenoid valves 29. Solenoid valves 29 are, for example, inlet valves and outlet valves of the slip control system, and may also be used for brake pressure regulation during a power brake application. The brake pressure per se is regulated during a power brake application by the displacement of external force piston 7 in external force cylinder bore 6.

Electromagnets 31 of solenoid valves 29, which are likewise illustrated as circuit symbols in the drawing, are situated outside hydraulic block 1 in valve domes 32 that protrude from valve side 30 of hydraulic block 1.

Hydraulic block 1 includes a master brake cylinder bore 33 in which a master brake cylinder piston, not illustrated, is displaceably accommodated. The master brake cylinder piston, which may also be referred to as a rod piston or primary piston, is displaceable in the master brake cylinder bore via a pedal rod with muscular power, using a foot brake pedal or a hand brake lever, not illustrated. For the design as a dual-circuit master brake cylinder, a second, so-called floating piston or secondary piston may be situated in master brake cylinder bore 33. Master brake cylinder bore 33 passes through hydraulic block 1 in parallel to the two large sides of hydraulic block 1 and in the center between the two large sides. The master brake cylinder piston(s) may be axially displaceably guided directly in master brake cylinder bore 33, or indirectly, for example, in a cylinder bushing that is situated in master brake cylinder bore 33.

Figure 5:
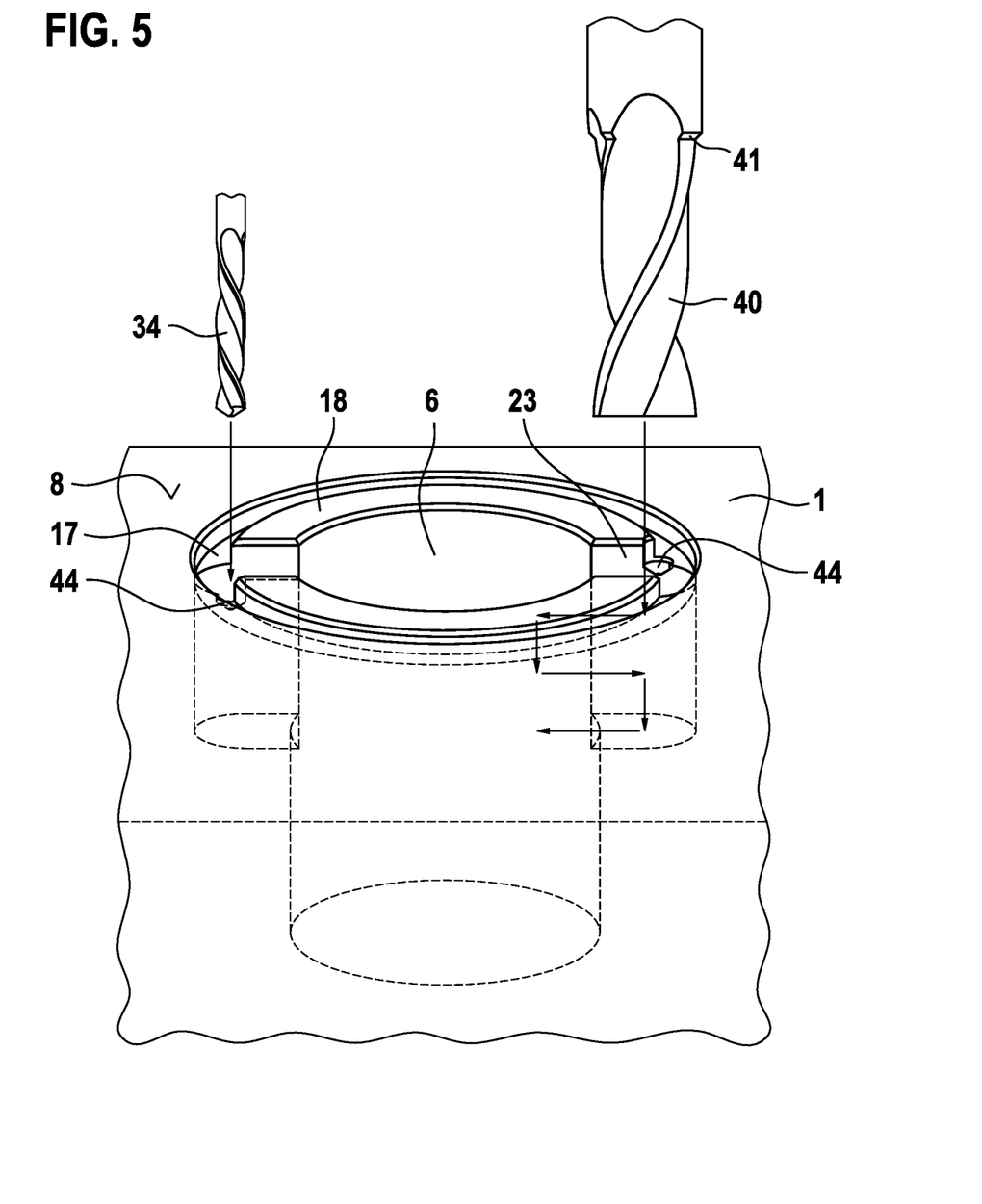
FIG. 5 shows drilling of a pilot bore and milling of a rotary protection groove according to an example embodiment of the present invention in a schematic illustration.

External force cylinder bore 6 is drilled into hydraulic block 1 or produced in some other way, in particular by machining. Beforehand, at the same time, or afterwards, so-called pilot bores 44 are drilled or produced in some other way, in particular by machining, in hydraulic block 1 axially parallel to external force cylinder bore 6 on motor side 8. The drilling of pilot bores 44 with a drill 34 is illustrated on the left side of FIG. 5. Pilot bores 44 are drilled into centering groove 17, diametrically opposite one another, at the edges at the transition of rotary protection grooves 23, rotary protection grooves 23 and centering groove 17 preferably being produced only after pilot bores 44. Pilot bores 44 avoid a blade-like sharp edge at the transition of rotary protection grooves 23 into centering groove 17, which could damage slide shoes 22 on tabs 21 of external force piston 7. Pilot bores 44 are provided at the edges, at which a crown milling cutter 39 or some other tool for producing centering groove 17 emerges from centering groove 17 and enters into rotary protection groove 23. No pilot bore is necessary at the edges at which crown milling cutter 39 or some other tool from rotary protection grooves 23 once again enters into centering groove 17, although pilot bores may still be provided at these edges. The pilot bore determines a rotational direction of crown milling cutter 39 or other tool in the production of centering groove 17, at the two edges of which pilot bores 44 are provided. Centering groove 17 and rotary protection grooves 23 are preferably produced after pilot bores 44.

After external force cylinder bore 6 is produced, circumferential grooves 35 for piston seals 36 (sealing rings) for sealing off external force piston 7, and indentations 37 that extend across limited circumferential sections in the circumferential direction, are milled or produced in some other way, in particular by machining, for example using disk milling cutters, not illustrated, into a circumferential surface of external force cylinder bore 6. Grooves 35 for piston seals 36 and indentations 37 may be produced before, during, or after pilot bores and rotary protection grooves 23 are produced.

Preferably after grooves 35 for piston seals 36 and indentations 37 are produced, the circumferential surface of external force cylinder bore 6 is precision-machined or finish-machined, for example using a finishing cutter 38 or a reamer. An axial section of the circumferential surface of external force cylinder bore 6 that axially displaceably guides external force piston 7 is precision-machined or finish-machined. The same tool, i.e., finishing cutter 38 in the exemplary embodiment, with which the circumferential surface of external force cylinder bore 6 is precision-machined or finish-machined includes crown milling cutter 39, mentioned above in conjunction with pilot bores 44, or some other device for producing centering groove 17, in particular by machining. Here as well, the tool that includes finishing cutter 38 and crown milling cutter 39 is referred to as a milling tool 42. As is apparent in FIG. 4, the circumferential surface of external force cylinder bore 6 is produced at the same time as centering groove 17, using a single tool, in the exemplary embodiment, using milling tool 42 that includes crown milling cutter 39 and finishing cutter 38. In any case, centering surface 19 for pivot bearing 15 of spindle nut 14 of helical gear 10 together with the circumferential surface of external force cylinder bore 6 is finish-machined using a tool, as the result of which centering surface 19 is precisely coaxial with the circumferential surface of external force cylinder bore 6.

Rotary protection grooves 23 are milled or machined in some other way, preferably after centering groove 17 is produced. A milling tool 40 as illustrated on the right side of FIG. 5 via arrows may be moved axially parallel and radially inwardly and outwardly in alternation. Milling tool 40 includes a bevel milling cutter 41, which in the last movement of milling tool 40 inwardly radially mills a bevel at an edge at the open end of rotary protection grooves 23 at their transition into motor side 8 of hydraulic block 1.

What is claimed is:

1. A hydraulic block for a hydraulic unit of a hydraulic vehicle power braking system, wherein the hydraulic block includes:
   an external force cylinder bore;
   a rotary protection groove for rotary protection of an external force piston, the rotary protection groove extending at a circumference of the external force cylinder bore in a longitudinal direction of the external force cylinder bore and opening toward the external force cylinder bore; and
   a centering groove that concentrically encloses an opening of the external force cylinder bore, an inner face and/or an outer face of the centering groove forming a centering surface, enclosing the opening of the external force cylinder bore, for a pivot bearing of a helical gear for displacing the external force piston.

2. The hydraulic block as recited in claim 1, wherein the rotary protection groove includes a rounded groove base.

3. The hydraulic block as recited in claim 1, wherein the at least one rotary protection groove includes two oppositely situated rotary protection grooves.

4. The hydraulic block as recited in claim 1, wherein the hydraulic block further includes a master brake cylinder bore.

5. A hydraulic unit of a hydraulic vehicle power braking system, the hydraulic unit comprising:
   a helical gear that includes a pivot bearing; and
   hydraulic block;
   wherein:
      the hydraulic block includes:
         an external force cylinder bore;
         a rotary protection groove for rotary protection of an external force piston, the rotary protection groove extending at a circumference of the external force cylinder bore in a longitudinal direction of the external force cylinder bore and opening toward the external force cylinder bore; and
         a centering groove that concentrically encloses an opening of the external force cylinder bore, an inner face of the centering groove forming a centering surface, enclosing the opening of the external force cylinder bore, for the pivot bearing of the helical gear for displacing the external force piston; and
      a bearing support of the pivot bearing rests against the inner face of the centering groove with a press fit.

6. A method for manufacturing a hydraulic block, the method comprising:
   providing a hydraulic block for a hydraulic unit of a hydraulic vehicle power braking system, the hydraulic block including an external force cylinder bore, and a rotary protection groove for rotary protection of an external force piston, the rotary protection groove (a) extending at a circumference of the external force cylinder bore in a longitudinal direction of the external force cylinder bore, and (b) opening toward the external force cylinder bore, wherein the hydraulic block includes a centering surface, enclosing an opening of the external force cylinder bore, for a pivot bearing of a helical gear that is used to displace the external force piston, and wherein the hydraulic block includes a centering groove that concentrically encloses the opening of the external force cylinder bore, an inner face and/or an outer face of the centering groove forming the centering surface for the pivot bearing of the helical gear; and finish-machining a circumferential surface of the external force cylinder bore and the centering surface at the same time, using at least one tool.

7. The method for manufacturing the hydraulic block as recited in claim 6, wherein bevels at end-face edges of the rotary protection groove at the opening of the external force cylinder bore are produced in the hydraulic block at the same time as a finish- machining of an end-face surface of the rotary protection groove at its end, using the at least one tool.

8. The method for manufacturing the hydraulic block as recited in claim 6, wherein, before the centering groove and the rotary protection groove are produced, a pilot bore is provided in the hydraulic block at an edge at a transition from the centering groove into the rotary protection groove.

\* \* \* \* \*